United States Patent
Codemo

(10) Patent No.: US 10,350,789 B2
(45) Date of Patent: Jul. 16, 2019

(54) CUTTING MACHINE AND INCORPORATED HANDLING DEVICES

(75) Inventor: Renzo Codemo, Villa d'Asolo-Asolo (IT)

(73) Assignee: BRETON SPA, Castello di Godego (Treviso) (IT)

( * ) Notice: Subject to any disclaimer, the term of this patent is extended or adjusted under 35 U.S.C. 154(b) by 613 days.

(21) Appl. No.: 12/884,370

(22) Filed: Sep. 17, 2010

(65) Prior Publication Data

US 2011/0283859 A1 Nov. 24, 2011

(30) Foreign Application Priority Data

May 19, 2010 (IT) .............................. TV2010A0078

(51) Int. Cl.
*B23D 45/02* (2006.01)
*B23D 47/04* (2006.01)
(Continued)

(52) U.S. Cl.
CPC .......... *B28D 7/046* (2013.01); *B23D 45/027* (2013.01); *B23D 47/04* (2013.01); *B23Q 7/04* (2013.01); *B25J 15/0616* (2013.01); *B27G 19/02* (2013.01); *B28D 1/043* (2013.01); *Y10T 83/2185* (2015.04); *Y10T 83/7734* (2015.04); *Y10T 83/96* (2015.04)

(58) Field of Classification Search
CPC .......... B27G 19/02; B28D 7/046; B28D 1/00; B28D 1/043; B28D 7/043; B23D 45/027; B23D 47/04; B23Q 7/04; B23Q 7/045; B25J 15/00; B25J 15/06; B25J 15/0616; B25J 15/0625; B25J 15/0633; B25J 15/0641; B25J 15/065; B25J 15/0658; B25J 15/0666; B25J 15/0675; B25J 15/0683; B25J 15/0691; Y10T 83/207; Y10T 83/2185; Y10T 83/7734; Y10T 83/96
USPC .................... 83/478, 100, 152, 860; 269/21; 125/13.01, 13.03, 20
See application file for complete search history.

(56) References Cited

U.S. PATENT DOCUMENTS 3,963,846 A 6/1976 Bourke
4,066,249 A * 1/1978 Huber et al. .................... 269/21
(Continued)

FOREIGN PATENT DOCUMENTS

DE 3720853 A1 1/1989
DE 4206274 A1 9/1992
(Continued)

OTHER PUBLICATIONS

"Italian Search Report dated Feb. 16, 2011 for IT TV201000078, from which the instant application is based," 2 pgs.
(Continued)

*Primary Examiner* — Clark F Dexter
(74) *Attorney, Agent, or Firm* — Fredrikson & Byron, P.A.

(57) ABSTRACT

A cutting device for a machine tool, suitable for mounting on the spindle support structure of a machine tool for processing and cutting materials, incorporates suckers able to cause the device to adhere to and be fixed to the materials being machined. Further, a cutting head having a protection device with incorporated suckers, a cutting spindle having a protection device with incorporated suckers and a machine for machining the materials, having a cutting spindle incorporating suckers.

24 Claims, 15 Drawing Sheets

(51) Int. Cl.
    *B23Q 7/04*                 (2006.01)
    *B25J 15/06*              (2006.01)
    *B27G 19/02*              (2006.01)
    *B28D 1/04*                 (2006.01)
    *B28D 7/04*                 (2006.01)

(56) References Cited

U.S. PATENT DOCUMENTS

| | | | | |
|---|---|---|---|---|
| 4,721,462 | A * | 1/1988 | Collins, Jr. | 432/253 |
| 5,098,508 | A * | 3/1992 | Mattil | 156/363 |
| 5,904,387 | A | 5/1999 | Nagai et al. | |
| 6,193,291 | B1 | 2/2001 | Morroney | |
| 6,484,393 | B1 * | 11/2002 | Chan | 29/840 |
| 2006/0053629 | A1 | 3/2006 | Martin | |

FOREIGN PATENT DOCUMENTS

| | | |
|---|---|---|
| EP | 0178944 A1 | 4/1986 |
| EP | 2253422 A1 | 11/2010 |
| WO | 9933622 A1 | 7/1999 |
| WO | 2006057024 A1 | 6/2006 |
| WO | 2011144270 A1 | 11/2011 |
| WO | 2011145005 A1 | 11/2011 |

OTHER PUBLICATIONS

"Italian Written Opinion (and English translation) dated Feb. 16, 2011 for IT TV201000078, from which the instant application is based," 7 pgs.

"PCT International Search Report dated May 23, 2011 for corresponding International Application No. PCT/IB2011/050725," 4 pgs.

"PCT Written Opinion dated May 23, 2011 for corresponding International Application No. PCT/IB2011/050725," 5 pgs.

European Office Action dated Oct. 15, 2013 for European counterpart application, serial No. 11710328.3; 6 pages.

* cited by examiner

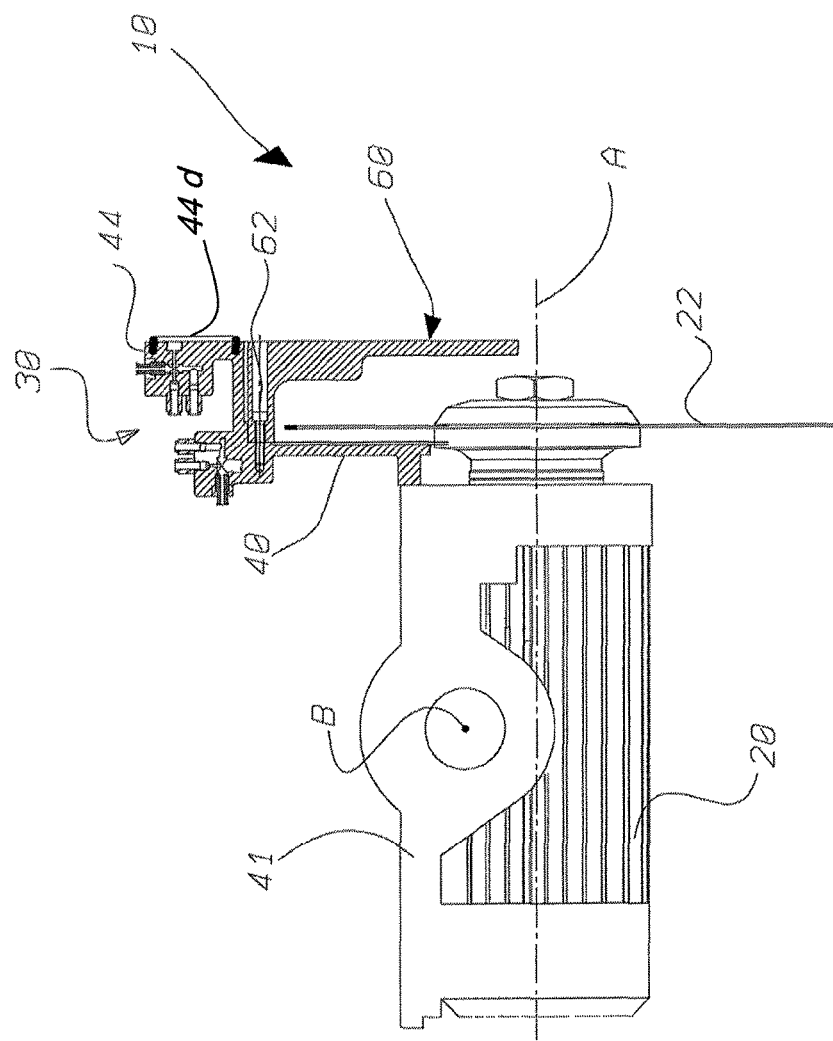

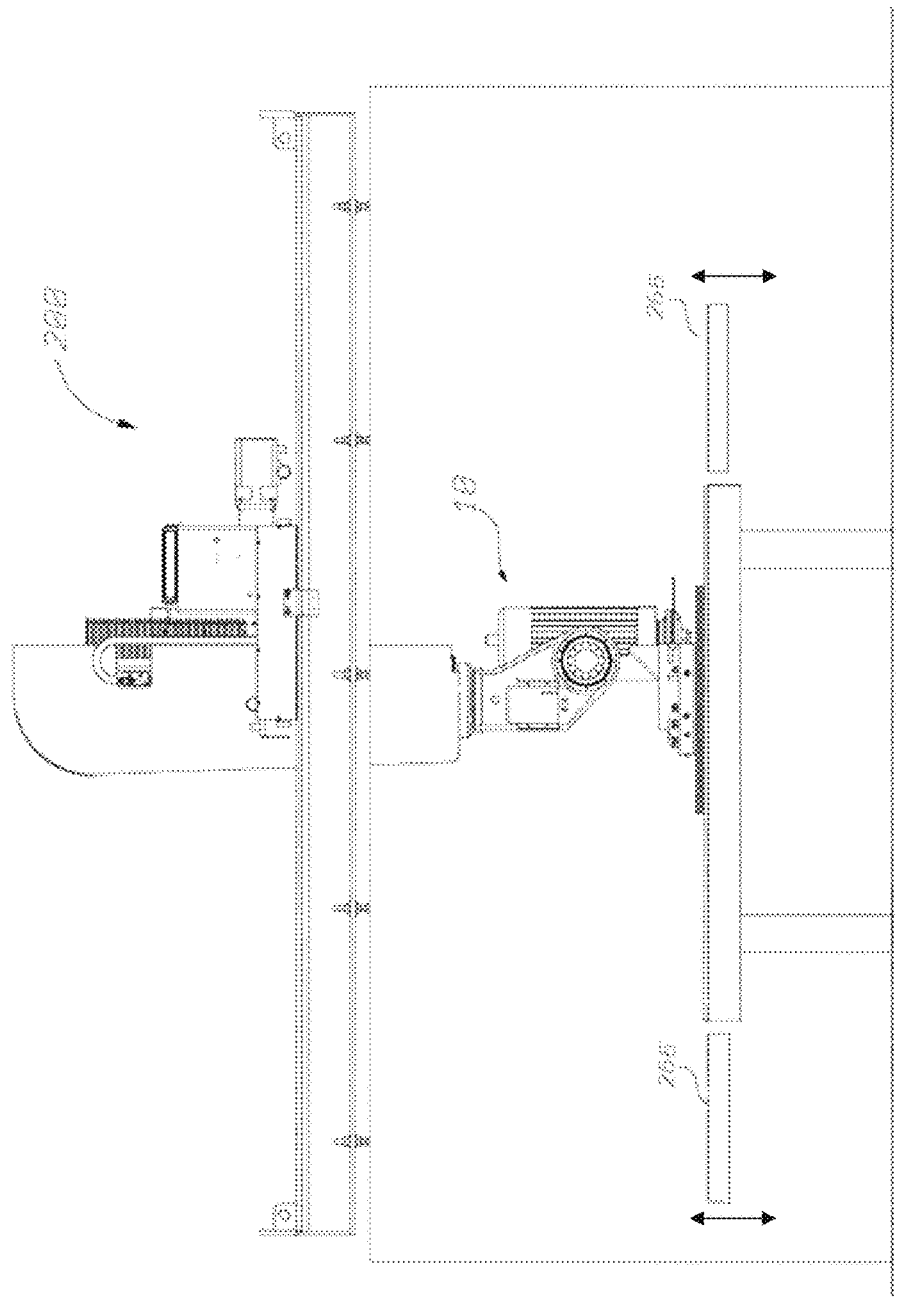

CUTTING MACHINE AND INCORPORATED HANDLING DEVICES

FIELD(S) OF THE INVENTION

The present invention relates to a cutting machine and incorporated handling devices for the material under processing. In particular, the invention also relates to an advantageous cutting device for a machine tool, suitable for mounting on the spindle support structure of a machine tool and incorporating means for handling the material. Moreover, the invention relates to an advantageous protection device for a cutting disc which is suitable for mounting on a cutting spindle of a machine tool for machining and cutting materials and incorporates systems for handling the material.

The invention also relates to a cutting head for a cutting spindle comprising a tool holder connection on which the cutting disc is mounted and on which a protection device is also fixed.

Furthermore, the invention also relates to a cutting spindle of a machine tool for machining and cutting materials, comprising a spindle motor provided with a fixed support onto which a protection device can be fitted, and a machine for processing materials, comprising a cutting spindle on which a protection device is mounted.

In the description of the invention below reference will be made to the cutting of slabs of natural and agglomerated stone, ceramic and glass material without this, however, being intended to be limiting. The machining of other materials may also be performed by a machine applying the principles of the present invention.

BACKGROUND

In order to cut the abovementioned materials a suitable cutting disc is used, for example a diamond cutting disc which necessarily must be provided with a suitable protection device in order to: prevent the operator from coming into contact with the rotating cutting disc and therefore suffering possible injury; prevent any diamond segments which may come off the cutting disc from being projected outside the working area, creating unsafe conditions for the operators; and contain the cutting fluid so that it is not sprayed also outside the working area and conveyed on the cutting disc itself.

For this purpose protection cowls or cases are provided, these covering the non-operative part of the disc, i.e. the part of the disc not in contact with the material to be cut and therefore substantially the top half of the disc.

Moreover, when it is required to cut a slab so as to obtain tiles, strips or any other semi-finished article for interior or urban furnishing, it is required to perform a series of longitudinal, transverse or oblique cuts which can not be performed directly after carrying out the first series of cuts; the parts being machined must be first spaced apart in order to be able to perform the subsequent cuts without damaging the adjacent parts.

This strip spacing operation may be performed manually, but must be performed by the operator, with the result that the machining time is increased considerably, and is also the cause of frequent positioning or alignment errors when performing the cuts. Moreover, the costs of the final product is increased in view of the high unit cost of specialized labour.

In order to reduce the cost and speed up the machining operation it has been thought to automate the manual operations described above by providing automatic manipulators.

There exist, therefore, machines with which manipulators for picking up and handling the pieces of cut material are associated.

For example, in the case of machines with a gantry structure, i.e. machines comprising two support structures which are arranged longitudinally and between which a spindle-carrying crossbeam extends transversely in a slidable manner, said crossbeam slidably supporting a sleeve support carriage on which in turn a spindle-carrying sleeve supporting on the bottom end a cutting spindle is vertically movable, it is possible to provide a second crossbeam which is similar to the spindle-carrying crossbeam and along which a sucker pick-up device slides. The manipulator has, in addition to the crossbeam with the pick-up device, a carriage which travels along the crossbeam on which the actual sucker pick-up device travels vertically.

Alternatively, the sucker manipulator may be mounted directly on the sleeve support carriage. In this case, the manipulator has a structure which extends from the spindle carrying sleeve and which is movable vertically with respect to the sleeve at the bottom end of which the sucker pick-up device is fixed.

According to another solution the sucker pick-up device extends from the cutting head in an external position and is provided with actuator means for moving it in the vertical direction.

Finally, according to another solution, the pick-up device is again mounted on the cutting head in a vertically stowed-away position, folded up against the head, and, if necessary, may be unfolded so as to be operative.

It is evident that all these automated solutions have various drawbacks.

Firstly it is required to provide manipulators with structures which are somewhat complex and are therefore costly.

Furthermore, these manipulators, owing to the various movable mechanical parts, are prone to faults or malfunctions. It is evident that a fault prevents execution of the cutting operations with consequent serious economic loss.

Furthermore these structures increase the overall dimensions of the machine and its final cost.

BRIEF SUMMARY OF EMBODIMENTS OF THE INVENTION

The main object of the invention is to provide a cutting machine which is able to handle automatically the cut material without, however, the drawbacks mentioned in connection with the prior art.

In particular, preferably the cutting machine is provided with means for picking up and handling the cut material without there being, however, excessive complications in relation to the main machine.

It is also desirable that the pick-up means should not introduce complicated additional mechanisms and should not increase substantially the overall dimensions of the machine, especially in the region of the cutting tool, and that the increase in the final cost of the machine should be relatively small.

These objects are achieved by means of a protection device for a cutting disc, suitable for mounting on a cutting spindle of a machine tool for machining and cutting materials, characterized in that it comprises sucker means able to cause said device to adhere and be fixed to the materials under processing.

The sucker means may thus be perfectly incorporated in the cutting disc protection device and therefore, owing to their simplicity, the cutting machine provided with such a protection device does not increase the overall dimensions with respect to the main machine.

Also the final cost of the machine is not subject to substantial increases.

It should be noted that the protection device provided with sucker means does not have complex moving parts so that it is reliable and not prone to faults or malfunctions.

It should be noted, finally, that such a device has a high degree of versatility since it may be applied also to existing machines, requiring only simple and quick adaptation and replacement operations.

Still according to the principles of the invention a cutting spindle of a machine tool for machining and cutting materials is proposed here, characterized in that it comprises a fixed support on which a protection device as described above is fitted.

Furthermore, according to the principles of the invention, a machine for processing materials is also proposed, characterized in that it comprises a cutting spindle on which a protection device as described above is mounted.

Preferably, the machine is characterized in that said cutting spindle is rotatable about a horizontal axis so as to assume, during operation, different working configurations in which said sucker means may be made to adhere to the material being processed in order to fix it to said device and then move it within the working area.

Preferably the different operating configurations range between a first end position, where the axis of rotation of said spindle is horizontal and therefore said cutting disc is vertical, in order to perform vertical cuts in the material to be processed, and a second end position in which the axis of rotation of said spindle is vertical and said cutting disc is horizontal in order to perform horizontal cuts in the material being processed.

In said second end operating position the sucker means may be made to adhere to a slab or to parts thereof so as to grip and then move them.

It is evident that the spindle, and therefore the cutting disc, may assume different configurations. For example, when the axis of the spindle is horizontal, and therefore the disc vertical, vertical cuts are performed in the material being processed. When, instead, the axis of the spindle is vertical and therefore the disc is horizontal, horizontal cuts may be performed in the material, but in particular, since the sucker means are directed downwards, it is possible to use them to grip and move the cut material arranged horizontally on the working bench.

In this way it is advantageously possible to grip the cut parts and move them simply by rotating the spindle and moving the spindle-carrying structure by means of the mechanisms which usually move the cutting disc.

In particular, the protection device is provided with suction means which comprise at least one Venturi tube element supplied with blowing air supplied from said cutting spindle and able therefore to create a vacuum which allows the parts being machined to adhere and be fixed to said device. It should be noted that the use of a Venturi tube element is not limiting for the application and that each of the Venturi tube elements may also be replaced with a corresponding vacuum circuit.

The protection device provided with the sucker means is therefore a device which is extremely simple, reliable, compact and low-cost also because, in the case where Venturi devices are used for generation of the vacuum, a reduction in the cost of the vacuum system is possible. As a result there is no substantial increase either in cost or in size with regard to both the spindle and the machine on which it is mounted.

Moreover, the material gripping and handling operations are very simple and quick.

Preferably, the cutting spindle comprises retaining means for a tool-holder connection. Said retaining means comprise preferably an insert mounted on the end of said spindle, said insert being provided for example with magnetic means for fixing said tool-holder connection to said insert and then to said spindle, or other types of fixing means, known per se, such as a bayonet, screw, shank or other type of coupling means.

In this way the cutting spindle is able to pick up and fix thereto a tool with a tool-holder connection, for example a boring tool, and after a rotation through 90°, thus arrange the spindle axis in a vertical direction and perform with the same cutting spindle the boring or other operations depending on the tool used.

In particular, the machine according to the present invention may advantageously be provided with a working surface which comprises a second cutting spindle positioned on said machining surface with the vertical disc which projects upwards from said working surface, so that, by picking up and moving the material to be cut by means of said sucker means on said disc of said second spindle, it is possible to perform cuts on the underside of the material.

BRIEF DESCRIPTION OF DRAWINGS

These and other advantages of the present invention will emerge more clearly from the following detailed description of a number of embodiments thereof provided by way of a non-limiting example, with reference to the accompanying drawings in which:

FIG. 3 is a vertical section through the spindle according to FIG. 1 showing the means for fixing the movable part of the protection device to the fixed part of the same device;

FIG. 22 is a side view of the machine according to another embodiment in which the spindle is shown in a second operating position for picking up and handling material;

DETAILED DESCRIPTIONS OF EMBODIMENTS OF THE INVENTION

Figure 2:
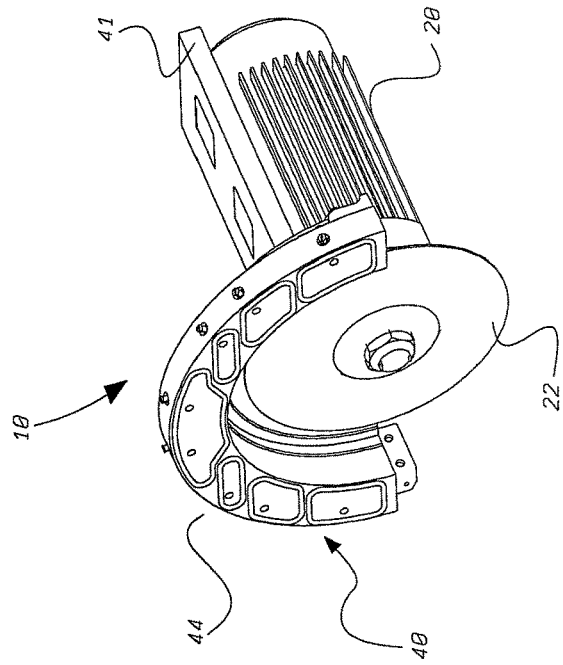
FIG. 2 is a perspective view similar to that of FIG. 1 in which the movable part of the protection device has been removed.
Figure 1:
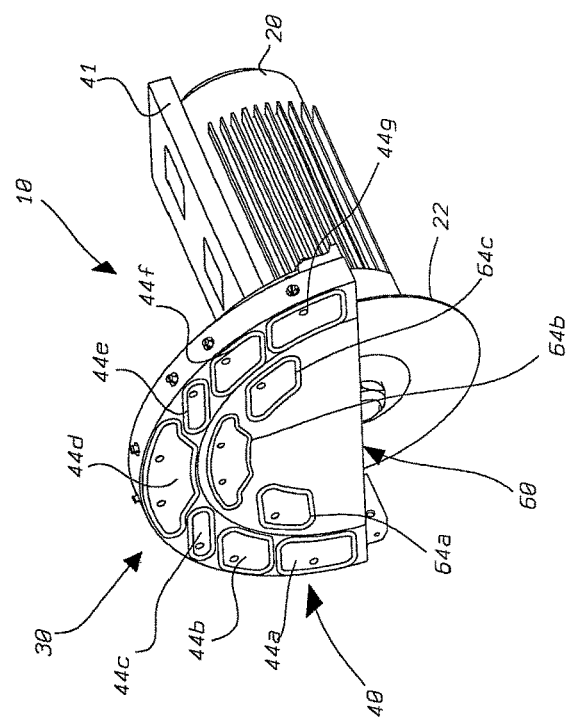
FIG. 1 is a perspective view of a cutting spindle provided with a protection device according to the invention.

FIGS. 1 to 4 show a cutting spindle 10 of a machine tool for machining and cutting materials.

As mentioned above, reference will be made to natural or agglomerated stone, ceramic or glass materials, without this being intended to be limiting. Other materials may obviously be processed by a machine applying the principles of the invention.

The cutting spindle 10 comprises a spindle motor 20 at the end of which a cutting disc 22 is mounted.

The top half of the cutting disc is covered by a protection device 30 which comprises sucker means. Advantageously, these means are incorporated in the protection device (advantageously always with a shape which matches the upper shape of the cutting disc) so as to be situated substantially inside the front profile of the protection device.

The sucker means are advantageously arranged with their operating surface lying in a plane parallel to the face of the cutting disc. Accordingly, and with reference to FIGS. 3 and 4 for example, the sucker means are arranged in a plane which is traverse to rotational axis A of the cutting disc 10. Advantageously, the protection device 30 comprises a first protection element 40, which is fixed onto the spindle structure or onto a fixed support 41 of the spindle 10 and which covers the rear side of the cutting disc 22 (i.e. the side of the disc facing the motor 20), and a second protection element 60 which is fixed removably onto the first protection element 40 and which covers the front side of the disc 22.

In FIG. 3 it can be seen that the second protection element 60 is fixed removably by means of screws 62 to the first protection element 40.

Figure 5:
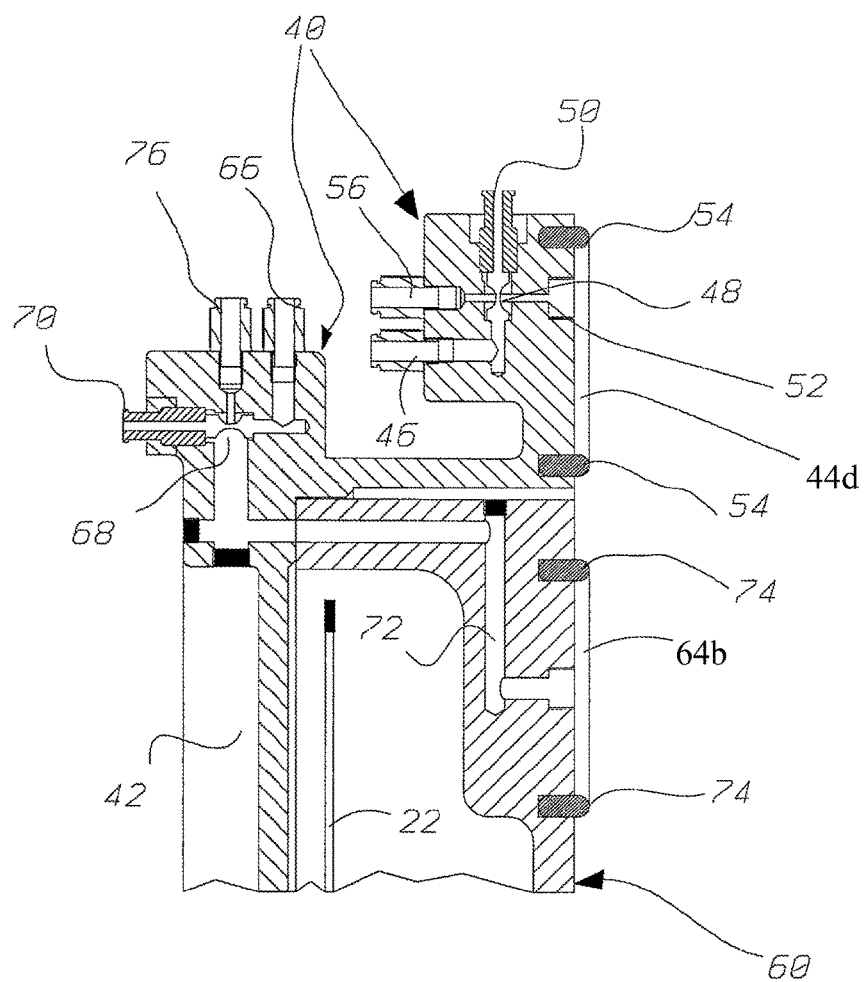
FIG. 5 is a view, on a larger scale, of a detail of FIG. 4 showing the sucker means.

As shown, for example, in FIG. 5, the first protection element 40 advantageously has a circular half-flange 42 provided on its semi-circular peripheral edge with a circular half-rim 44 on which suckers means in the form of suckers 44a, 44b, 44c, 44d, 44e, 44f are formed.

The second protection element 60 has preferably a substantially semi-circular shape, the outer edge of which coincides with the inner edge of the circular half-rim 44. In particular, it can be noted that the circular half-rim 44 and the second protection element 60 are flush with each other and there are therefore no parts which project and/or extend relative to each other.

Suckers means in the form of suckers 64a, 64b, 64c are formed on the second protection element 60.

Figure 4:
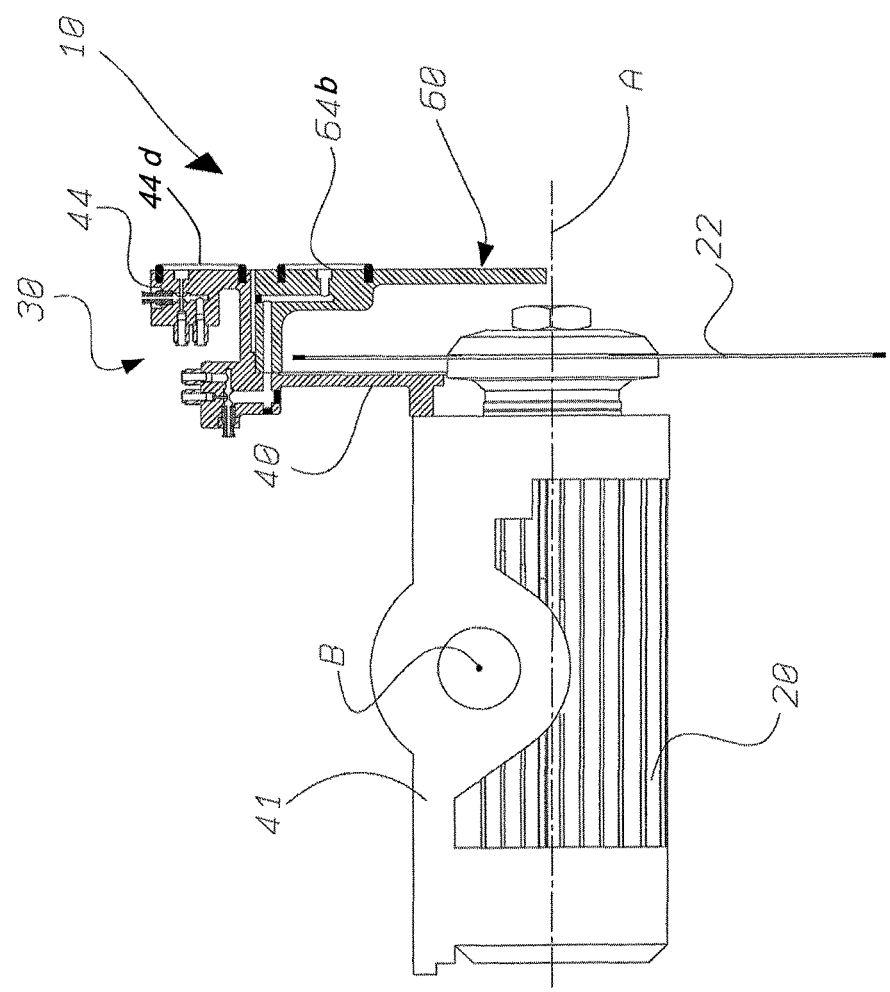
FIG. 4 is a vertical section through the spindle according to FIG. 1, similar to that of FIG. 3, showing the sucker means.

As can be seen in FIG. 4, but in particular in FIG. 5, each sucker is advantageously supplied by means of its own supply circuit.

For example, the sucker 44d of the first protection element 40 is advantageously supplied by an air inlet channel 46 which has a constriction so as to form a Venturi tube element 48 and finally an air outlet channel 50. Opposite the Venturi tube 48 there is a communication channel 52 which leads into the sucker 44d or, more specifically, inside the sealing ring 54 of the sucker 44d.

Therefore, by supplying the channel 46 with blowing air, owing to the depression created inside the Venturi tube, a depression is created that owing to the communication channel 52, causes the depressurization also of the sucker 44d.

Similarly, the sucker 64b of the second protection element 60 is advantageously supplied by an air inlet channel 66 which has a constriction so as to form a Venturi tube element 68 and finally an air outlet channel 70. Opposite the Venturi tube 68 there is a communication channel 72 which leads into the sucker 64b or, more specifically, inside the sealing ring 74 of the sucker 64b.

By supplying, therefore, the inlet channels 46, 66 with blowing air, the suckers are activated so as to be able to pick up the cut material, as will be described more fully below.

It should be noted that, preferably, supply channels 56, 76 are provided opposite the Venturi tubes 48 and 68 and introduce blowing air directly into the respective communication channels 52, 72 so as to convey pressurised air to the suckers 44d, 64b and thus facilitate separation of the material adhering to the suckers 44d, 64b.

Figure 6:
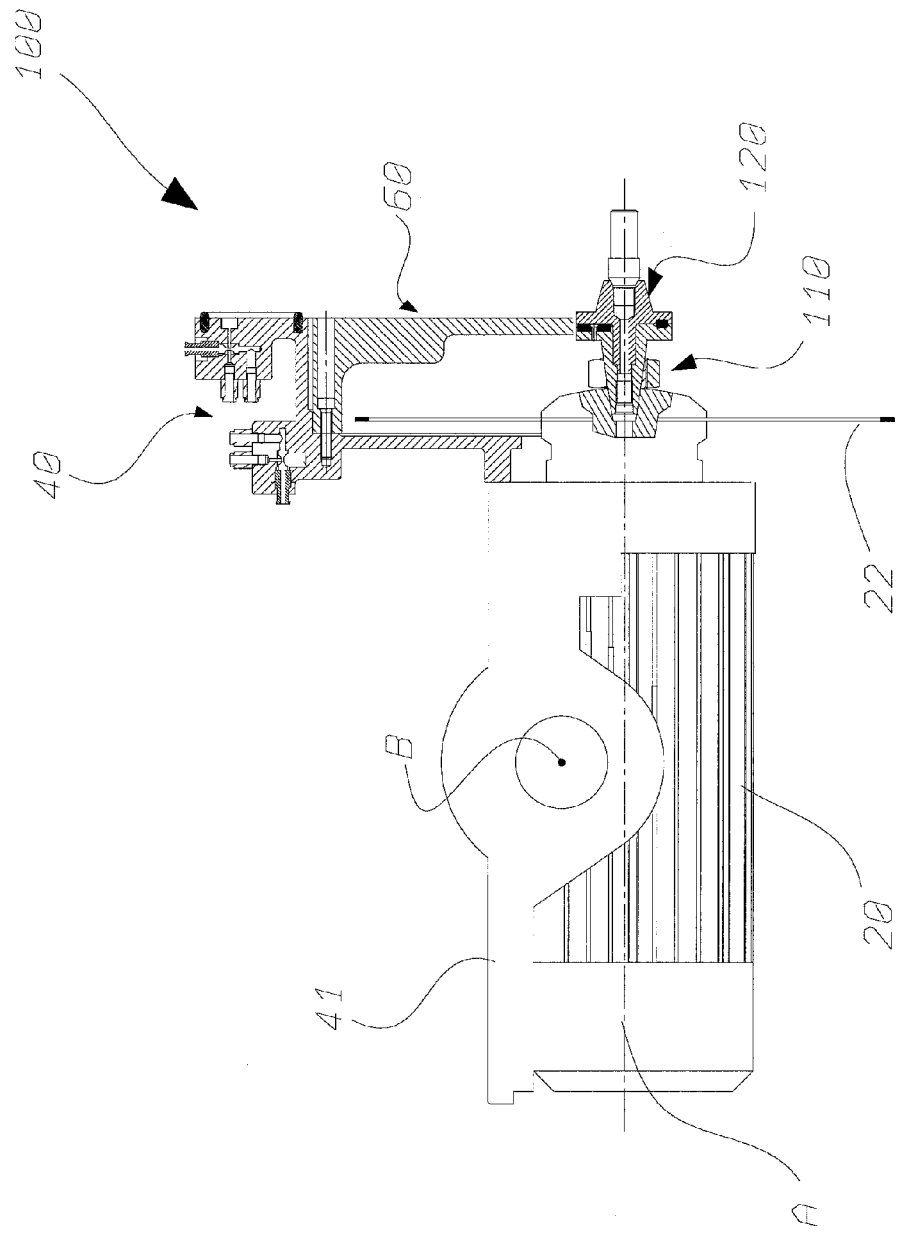
FIG. 6 is a view of a spindle according to the invention on which a boring tool with associated connection is mounted.
Figure 7:
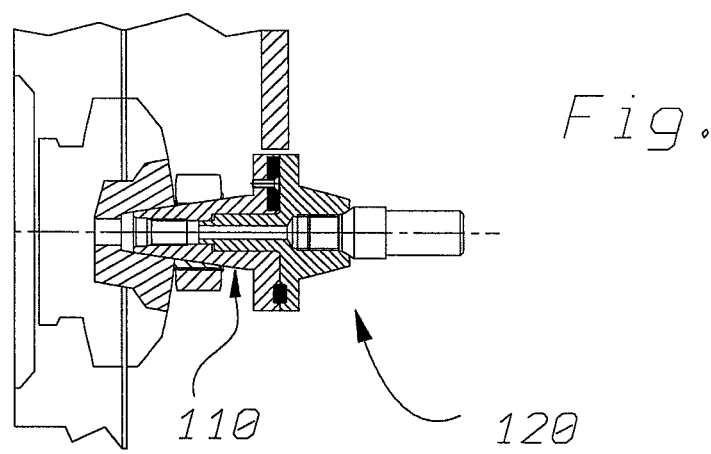
FIGS. 7 and 8 are two cross-sections of FIG. 6, on a larger scale, showing the boring tool with associated connection.

FIGS. 6 and 7 show, instead, a cutting spindle 100 similar to the cutting spindle 10 described with reference to the preceding figures, but provided with retaining means 110 for a tool 120.

Figure 8:
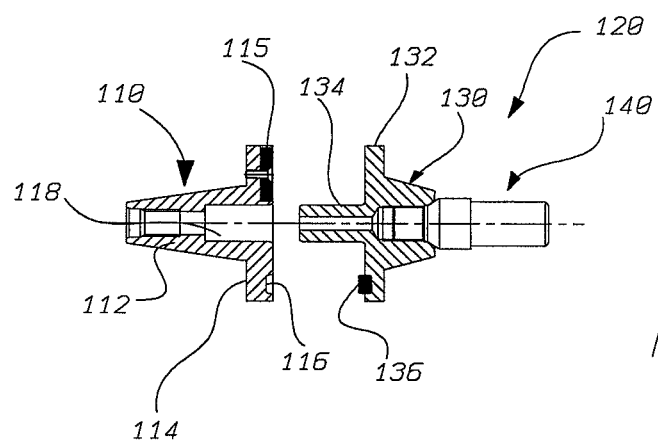

As can be seen more clearly in FIG. 8, the retaining means 110 comprise, for example, a conical connection 112 mounted on the free end of the spindle 100, but other known types of connection could also be used, such as a gas thread connection or the like. Advantageously, the conical connection 112 has a flanged end 114 which has, fixed therein, a further tool retaining connection 115 which, for example, may be of the magnetic type and which has, formed therein, at least one seat 116 for receiving tool driving elements such as a seat for a lug. The connection 112 is hollow, i.e. has an axial through-hole 118.

The tool 120 in turn has a tool-holder connection 130 on which the tool portion 140 of tool 120 is fixed. The tool-holder connection 130 has a flange 132 intended to interface with the flange 114 of the connection 112. A shank 134 extends from the flange 132 and is designed to be inserted inside the through-hole 118 of the conical connection 112. The flange 132 may be provided with a tool driving device 136, such as a lug, designed to engage inside the corresponding seat 116 formed in the flanged end 114 of the conical connection 112.

Owing to the magnet 115 which magnetically holds onto the flange 132 and the lug 136 which engages inside this seat 116, the tool-holder connection 130 is firmly held on the conical fixture 112.

The tool 120, or rather the tool portion 140 thereof, may be a milling, boring or other type of tool. More frequently, it is a boring tool, the mode of use of which will be described below.

Figure 9:
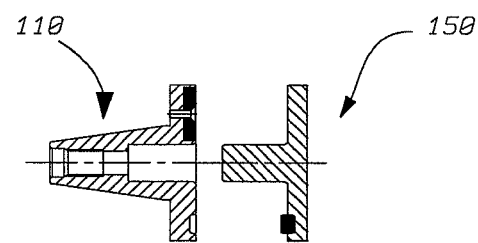
FIG. 9 is a vertical section, on a larger scale, of the end of the spindle according to FIG. 6 without boring tool and fitted with a cover.

In FIG. 9 is shown the retaining means 110 end of the spindle 100 advantageously closed by means of a cover 150 in the case the retaining means 110 is not used for engaging the tool 120.

It is evident that, when the tool 120 is mounted on the retaining means 110 of the spindle 100, the tool 120 projects from the first and second protection elements 40, 60 and therefore the suckers 44a,b,c,d,e,f,g can not be used to pick up the material being processed. In order to be able to use them it is required to deposit first the tool 120 inside the corresponding store.

Figure 10:
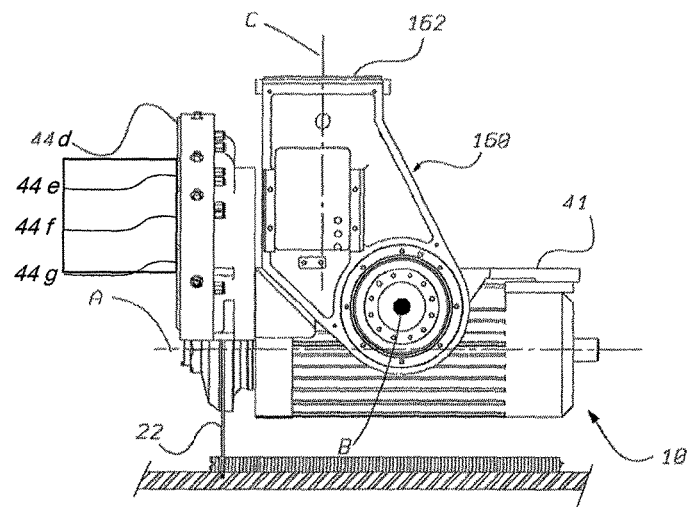
FIGS. 10 and 11 are side views of the spindle corresponding to two operating positions with operation of the disc and sucker means, respectively.
Figure 11:
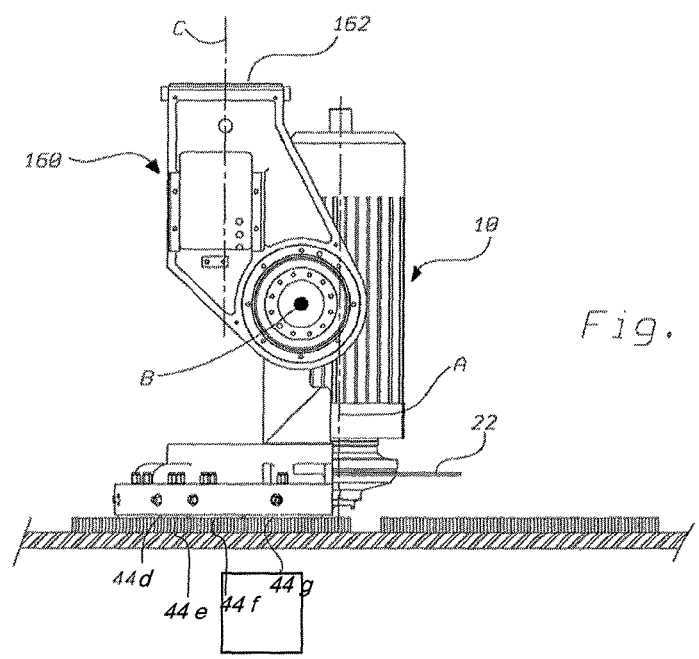

FIGS. 10 and 11 show the spindle 10 mounted rotatably on a fork-shaped structure 160.

The fork-shaped structure 160 comprises a flange 162 intended to be fixed rotatably about a vertical axis C to the bottom end of a sleeve of a machine tool, as will be described more fully below.

The spindle 10 is mounted in turn rotatably on the fork-shaped structure 160 so as to be rotatable about a horizontal axis B.

The spindle 10 may assume two end positions: a first end position, where the axis of the spindle A is horizontal (FIG. 10) and therefore the cutting disc 22 is vertical, in which position the disc performs the cutting operations, and a second end operating condition where, after rotating the spindle 10 about the axis of rotation B through an angle of 90°, the axis of the spindle A is arranged vertically and therefore the disc 22 is arranged horizontally (see FIG. 11). In this condition it is possible to perform horizontal cuts on the material, but in particular it is possible, using the suckers 44a,b,c,d,e,f and 64a,b,c, to pick up the material being processed and move it.

Figure 12:
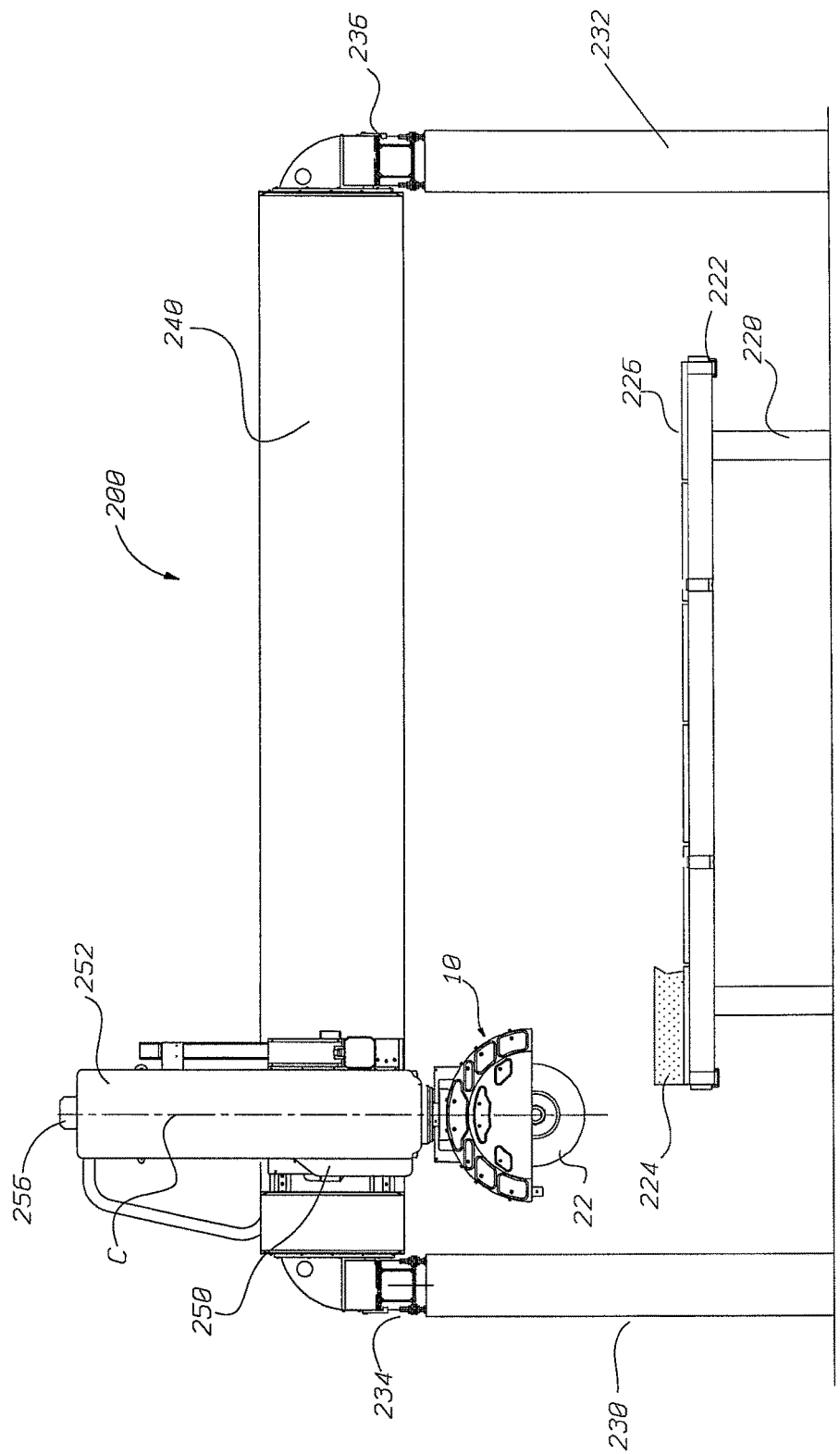
FIG. 12 is a front view of a cutting machine with a spindle according to the invention shown in a first operative cutting position.
Figure 13:
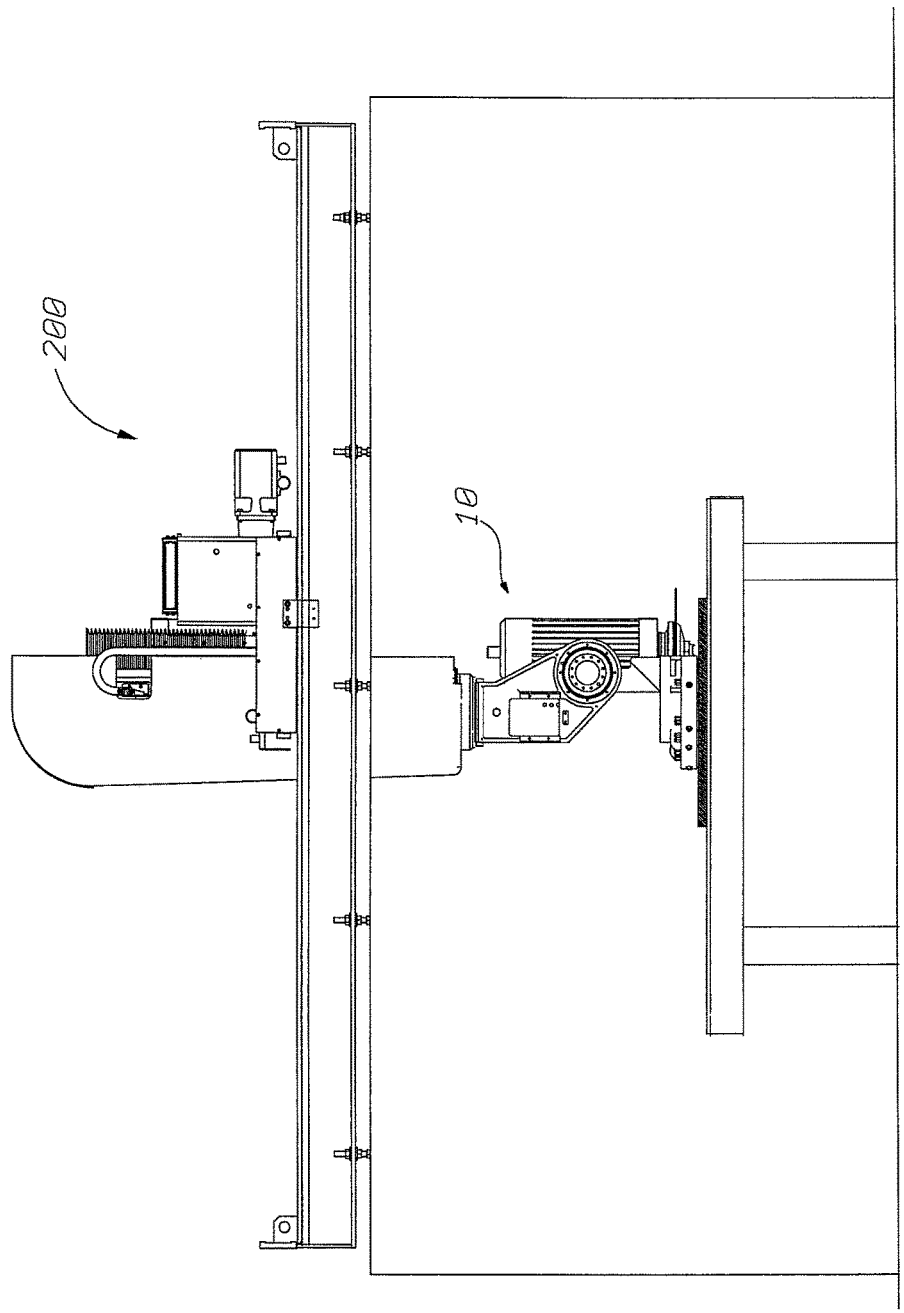
FIG. 13 is a side view of the machine according to FIG. 9 in which the spindle is shown in a second operating position for picking up and handling material.

Finally, in FIGS. 12 and 13 a machine tool 200 for cutting materials is shown, which is fitted with a spindle 10, or alternatively the spindle 100, as described above.

The machine 200 comprises a base 220 with, mounted thereon, a work surface 222 on which a rough slab 224 to be processed is deposited. A wooden board 226 is arranged between the work surface 222 and the slab to be machined so that during the cutting operations the disc does not score the work surface, but instead the wooden board which must be periodically replaced with a new one.

As an alternative to the wooden board, it is possible to provide a conveyor belt 2261 (best seen in FIG. 21) with a thick rubber-lined surface able to receive the incisions of the cutting discs, so as to automate and speed up unloading of the machined material.

Alternatively and advantageously it is possible to provide a metal base on top of which supports made of soft material are mounted, said supports being able to support the material to be machined in a spaced position so that the cutting disc or machining tool does not cut into the metal base. For example, these supports may consist of metal bars onto the top end of which corresponding plastic profiles are fitted.

In this way, the machining waste no longer accumulates on the machining surface but instead falls down through the supports so that cleaning of the machining surface is reduced considerably.

The machine 200 is bounded at the two ends by two longitudinally arranged support structures 230, 232 on which respective travel rails 234, 236 are mounted.

A spindle-carrying crossbeam 240 is mounted between the two support structures 230 and 232, being arranged transversely with respect to the longitudinal direction and movable along the two support structures 230, 232 via the travel rails 234, 236 by motor means not shown in the figures.

A sleeve support carriage 250 is slidably mounted on said crossbeam 240 and has in turn, mounted thereon, a spindle carrying sleeve 252 which is vertically movable by means of a drive unit 256 and which has, mounted on its bottom end, the spindle 10 for rotation of the cutting disc 22 or the machining tool 120.

It should be noted that the guide means and motor means for moving the crossbeam 240, the sleeve support carriage 250 and the spindle carrying sleeve 252 are known per se, consisting for example of rack and pinion mechanisms, trapezoidal or recirculating ball bearing screws, or the like, so that they are not described below, nor shown in the figures.

It must be pointed out, however, that the above description is necessarily generic in nature where it relates to a machine structure and components essentially of the prior art, such that they may be easily imagined by the person skilled in the art and a fuller description is not necessary.

From the above description it can be noted that the position of the spindle 10, and therefore of the cutting disc 22 or the machining tool 120, is adjustable so that it can be arranged opposite any point on the work surface 222: this is achieved by means of suitable displacement of the crossbeam 240 transversely with respect to the work surface 222 and a suitable sliding movement of the sleeve support carriage 250 along the said crossbeam.

Figure 17:
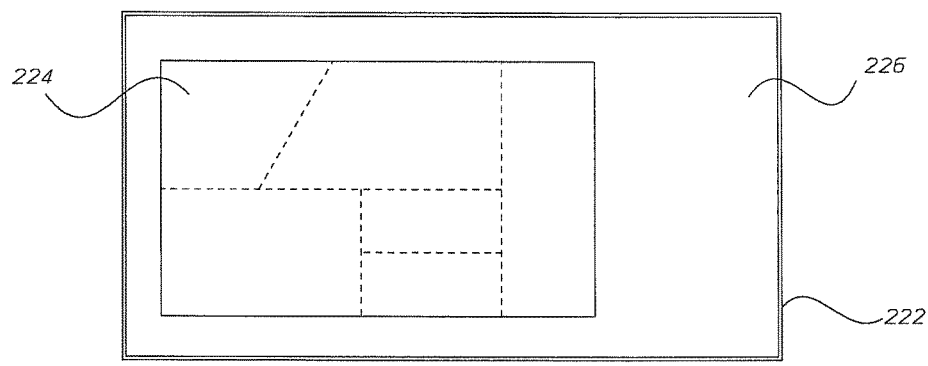
FIG. 17 shows a slab with an example of the cuts to be performed, positioned on the cutting bench.
Figure 18:
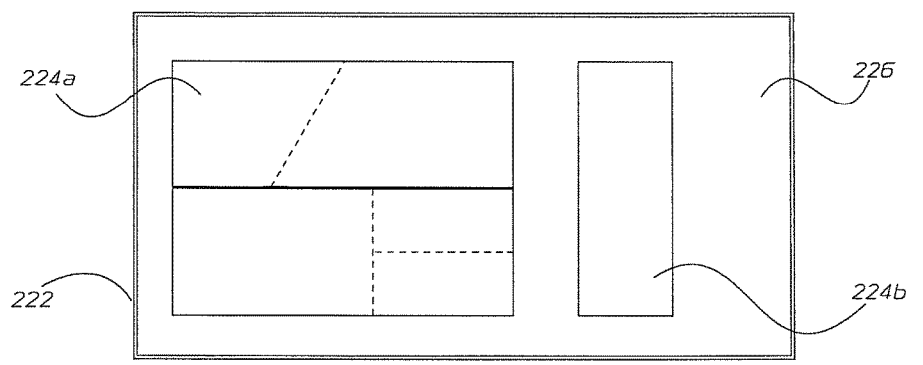
FIG. 18 shows the slab according to FIG. 17 during an intermediate stage of the cutting operations.
Figure 19:
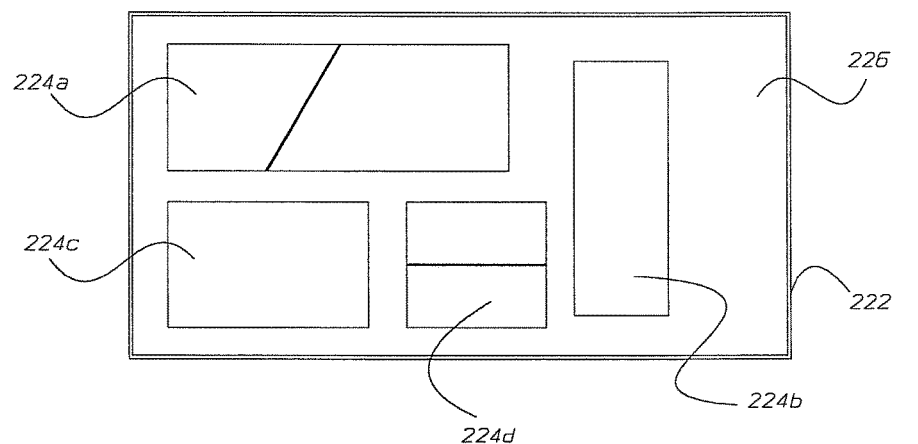
FIG. 19 shows the slab according to FIG. 17 with the various parts cut and spaced apart at the end of the cutting operation.

The operating principle of the machine is as follows:

After performing a first series of cuts on the rough slab 224, the suckers 44a,b,c,d,e,f and 64a,b,c are activated so as to separate the adjacent strips or parts which must again be cut in such a way that the cutting disc 22 does not score and damage the adjacent parts, as for example schematically shown in FIGS. 17, 18 and 19.

Since the spindle is rotatable about the vertical axis C, the suckers may also displace strips formed with cuts which are transverse to the longitudinal axis of the bench.

The machine 200 may comprise a second cutting spindle (not shown in figures) positioned with the vertical disc which projects upwards from the machining surface.

In this way, by picking up and moving the material to be cut using the suckers on the disc of the second spindle, it is possible to perform cuts on the underside of the material.

It is therefore possible to operate on the rear non-visible side of the piece of material, for example in order to form grooves inside which reinforcing elements ("rodding") are inserted or form blind holes inside which the fixing bushes, for example for kitchen sinks, are later inserted, by means of a special tool applied to a further auxiliary spindle arranged alongside.

Once the machining operations have been completed, the finished material is unloaded manually by the operator.

Figure 21:
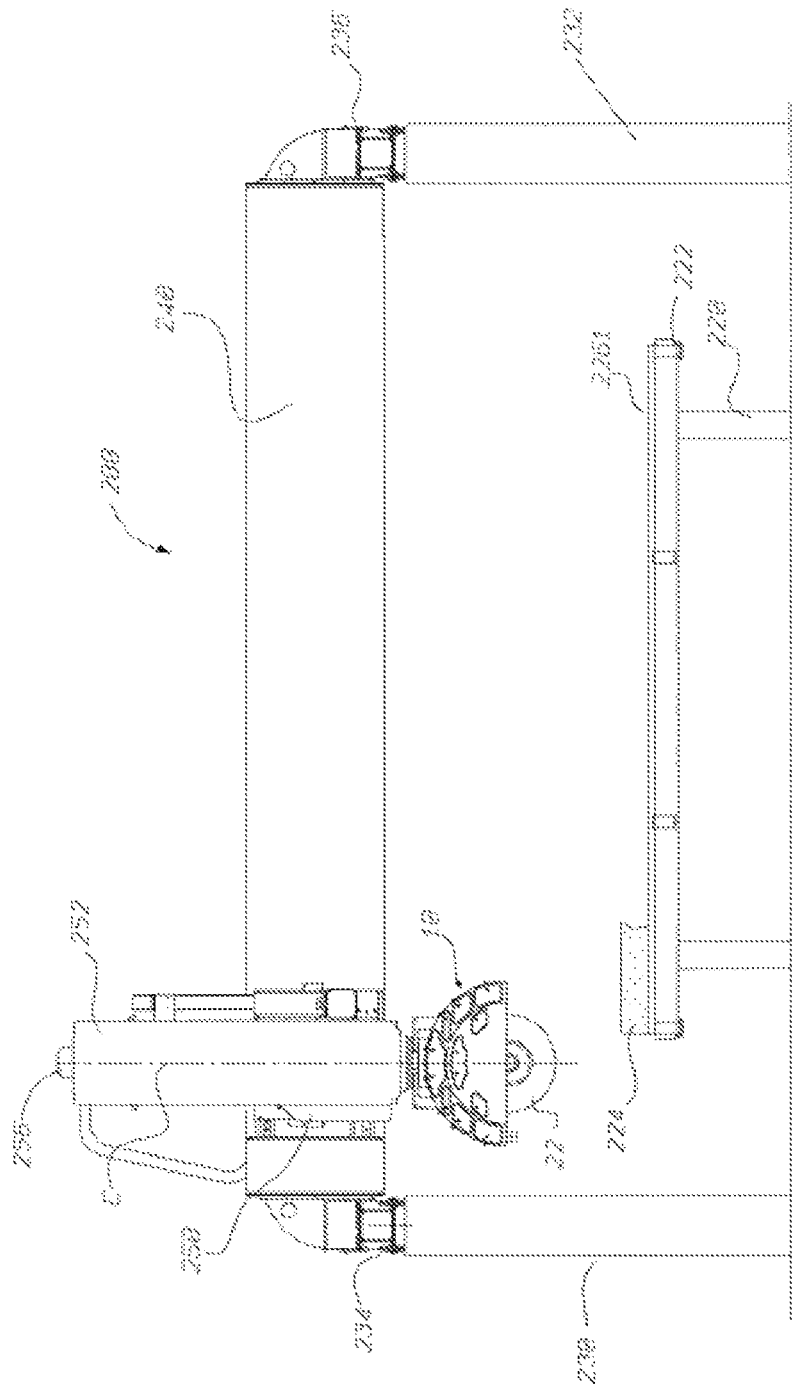
FIG. 21 is a front view of a cutting machine with a spindle according to the invention shown in a first operative cutting position according to another embodiment

It is also possible to perform loading of the rough slab on one side of the machine and unloading of the machined parts on the other side of the machine in a completely automatic manner by providing, for example, both on the loading side and on the unloading side a shuttle, conveyor belt or rollerway; in this case the workbench is provided with a conveyor belt 2261 (as shown in FIG. 21) with a thick rubber-lined covering suitable for receiving the incisions of the cutting discs.

Alternatively, loading and unloading means each may be arranged on only one side of the machine by providing, for example, two horizontal and vertically spaced support surfaces, schematically shown in FIG .22 as 266, 266 said support surfaces comprising means for moving the material and being vertically movable so as to be able to align alternately any one of the two support surfaces with the machining surface 222; in this way, while the support surface 266 aligned with the machining surface 222 feeds the machine with the material to be machined and/or unloads the machined material, the second support 266 surface unloads the machined material and/or is loaded with new material to be machined.

The suckers 44a,b,c,d,e,f and 64a,b,c are advantageously able to be operated individually, namely independently of each other, so as to allow the gripping of parts of varying sizes and form.

With this machine both optimized cutting of the slab and machining of the underside of the slab may be easily performed.

The suckers may also be used to load the rough material to be machined and if necessary unload the finished material.

In this way, the need for human action is eliminated and the machining times are reduced with consequent significant cost savings.

What is more, if the machine is incorporated in a machining line and therefore with automated loading and unloading, the advantages are even more evident.

Figure 14:
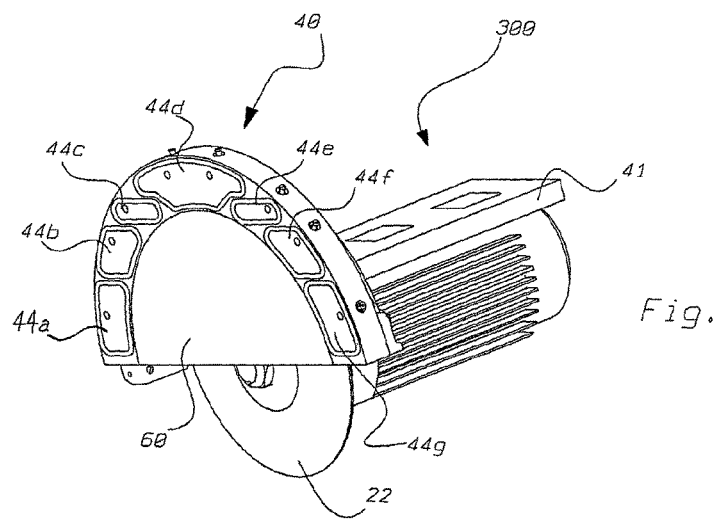
FIG. 14 is a perspective view of a spindle according to a first variant in which the sucker means are provided only on the fixed part of the protection device.
Figure 15:
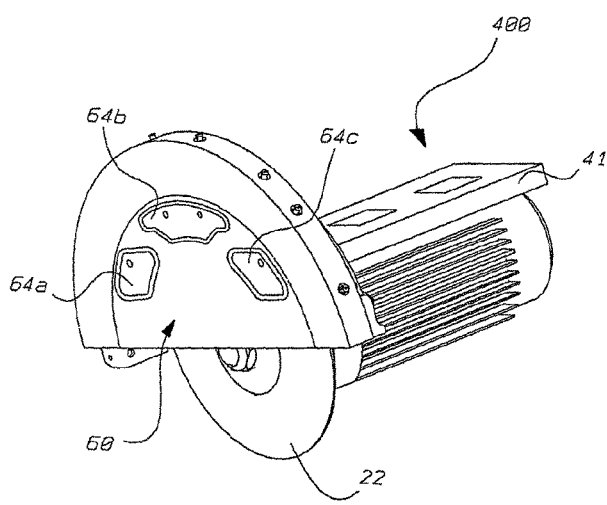
FIG. 15 is a perspective view of the spindle according to a second variant in which the sucker means are provided only on the movable part of the protection device.

FIGS. 14 and 15 show, respectively, a cutting spindle 300 and a cutting spindle 400 according to other variants of the invention.

The cutting spindle 300 is provided with only suckers 44a,b,c,d,e,f,g on the first protection element 40, while the second protection element 60 is without suckers.

The spindle 400 is instead provided only with suckers 64a,b,c on the second protection element 60, while the first protection element 40 is without suckers.

Figure 20:
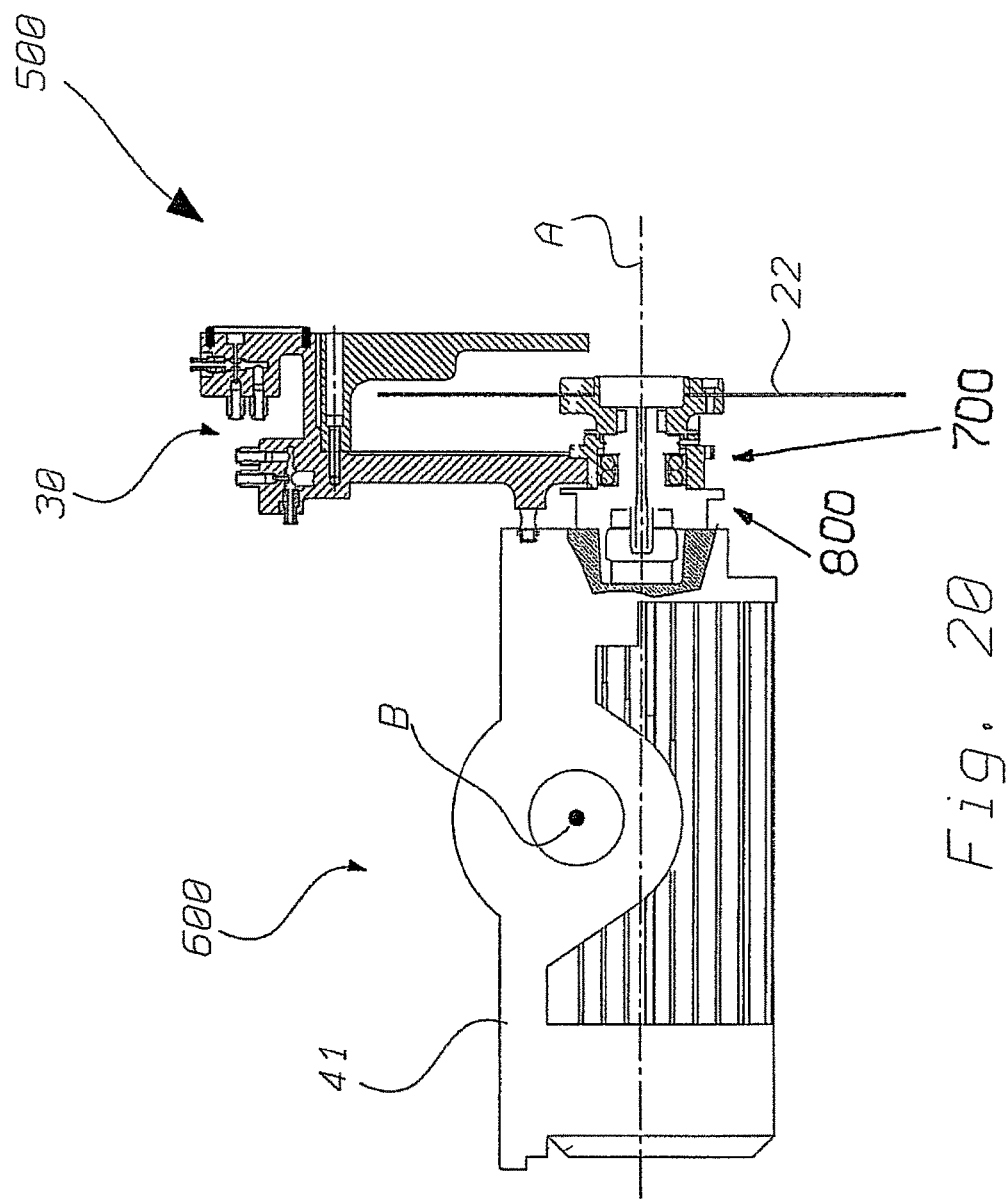
FIG. 20 shows a cutting head with tool fixture on which the disc protection according to the invention is mounted.

As shown in FIG. 20, it is also possible to envisage a cutting head 500 comprising a known tool-holder connection 700 on which the cutting disc 22 is mounted and the protection device 30 is fixed as described above.

The cutting spindle 600 is in turn provided with a known tool-holder coupling 800 with which the connection 700 can be coupled so that the cutting head 500 can be removed in a known manner from a special store by the cutting spindle 600 via the tool-holder connection 700.

It is evident that any variant or modification which is functionally or conceptually equivalent falls within the scope of protection of the present invention.

For example, the protection device 30 instead of being fixed on the spindle 10, 100, 200, 300 may be fixed on a structure for supporting the cutting spindle, mounted on the bottom end of the spindle carrying sleeve 252.

Figure 16:
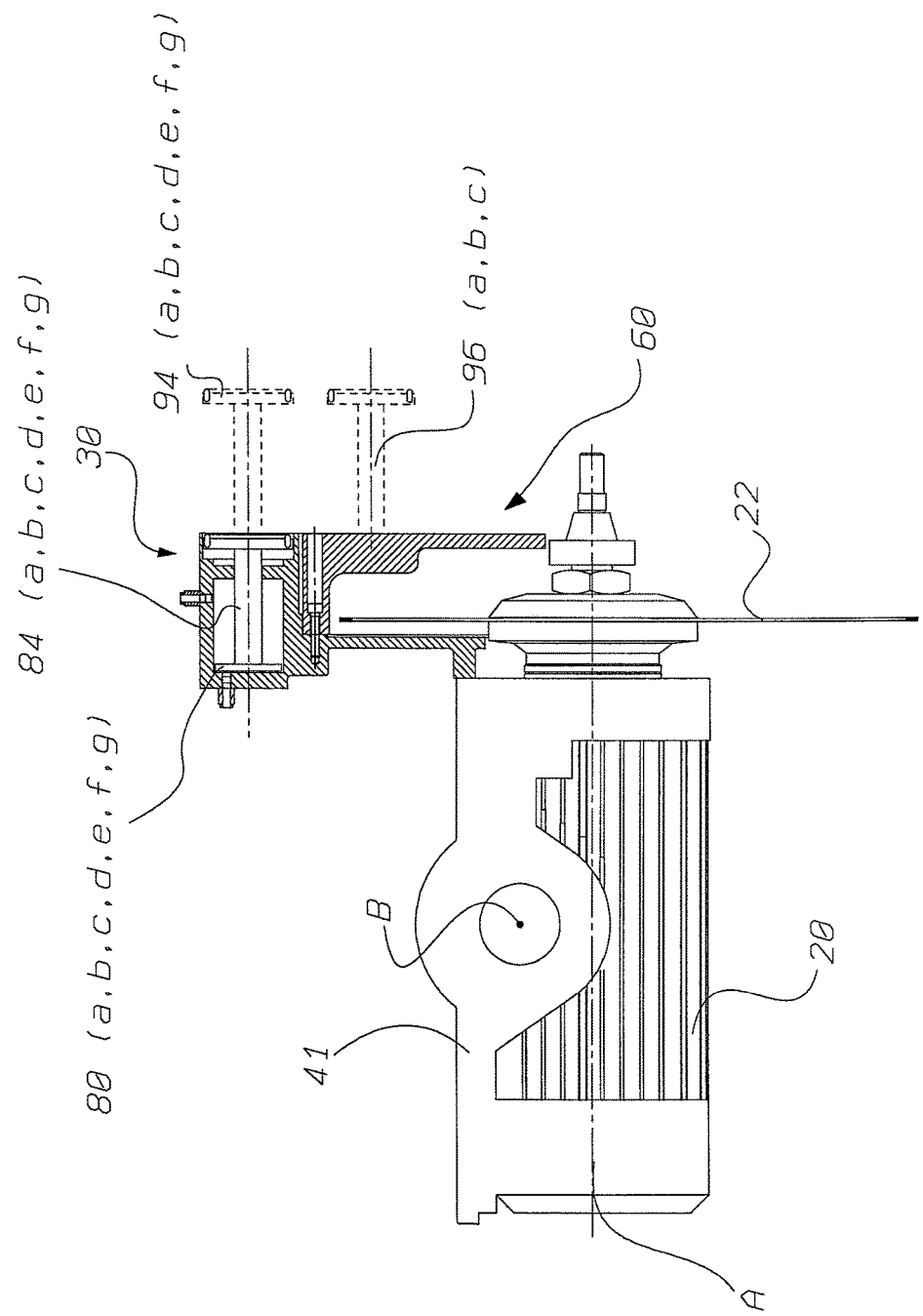
FIG. 16 shows a variation of embodiment of the sucker means in which said means are movable and shown in a partially sectioned view of the protection device.

Another variant consists in designing the suckers 44a,b,c,d,e,f,g and the suckers 64a,b,c so that they are extractable from the first and second protection elements 40 and 60. For example, each sucker may be associated with a pneumatic actuator as shown, for example, in FIG. 16 in which, for example, the suckers 94a,b,c,d,e,f,g supported by means of a shaft 84a,b,c,d,e,f,g project from the protection device 30 being moved by a pneumatic actuator 80a,b,c,d,e,f,g, the vacuum generation devices described above instead remaining unvaried.

In this way the tool 120 may be left always mounted on the spindle 100 since, if the suckers are retracted, the tool 120 may be used to perform the boring operations, whereas when the suckers are extended they project more from the tool 120 and may be used to pick up and move the material being processed.

It is also possible to envisage that the protection element with the suckers may be motor-driven so as to move relative to the blade, such as to be pivotable separately from the blade into the horizontal position for picking up by means of suction the material being processed.

At this point it is clear how the present objects have been achieved. It must be noted that with an advantageous embodiment where the sucker means are incorporated in the protection element of the rotating tool so as to be substantially included inside the front profile of the protection element, the machine control system does not have to take into account additional dimensions and, during machining, may continue to move the cutting head as though the sucker means were not present, with all the resultant advantages both in terms of easier control and freedom of movement of the cutting head.

The invention claimed is:

1. Protection device in combination with a cutting disc, the cutting disc having a rotational axis, the protection device comprising:
   a protection element that partially overlays and shields the cutting disc, thereby forming an enclosure that at least partially surrounds a portion of the disc; and
   sucker means which are incorporated on an outer surface of the protection element, the sucker means comprising openings in the outer surface so as to correspondingly move with movement of the protection element, the openings being oriented to face in a direction away from the cutting disc and outward from the enclosure, the openings in fluid connection with a vacuum circuit to provide suction for the sucker means, and the openings being closed off from an inner area of the enclosure wherein the cutting disc resides.

2. Protection device according to claim 1, characterized in that the protection element has a semi-circular peripheral edge with a circular half-rim on which the sucker means are arranged.

3. Protection device according to claim 2, characterized in that the protection element is a first protection element and the device comprises a second protection element which is mounted on said first protection element so as to close the circular half-rim and which is removable so as to allow disassembly of the cutting disc.

4. Protection device according to claim 3, characterized in that the second protection element is provided with further sucker means.

5. Protection device according to claim 1, characterized in that said sucker means comprise a plurality of suckers.

6. Protection device according to claim 5, characterized in that the suckers of said plurality of suckers are independently operable.

7. Protection device according to claim 5, characterized in that said plurality of suckers are incorporated in the protection element.

8. Protection device according to claim 1, characterized in that said sucker means are movable between a rest position so as to be contained inside the protection element, and an operating position so as to project from said protection element.

9. Protection device according to claim 1, characterized in that said vacuum circuit comprises at least one Venturi tube element connected to the sucker means such that when the vacuum circuit is supplied with blowing air, a vacuum is created in the sucker means.

10. The protection device of claim 1, wherein the sucker means are arranged in a plane which is traverse to said rotational axis, wherein action of the sucker means at the distal surface is in a direction that is substantially parallel to said rotational axis.

11. The protection device of claim 1, wherein the sucker means are arranged in a plane on the outer surface of the protection element, the plane being substantially parallel to a planar surface of the cutting disc.

12. Machine for processing materials, comprising:
a working surface,
a cutting spindle on which a cutting disc with a rotational axis is mounted, and motor means for moving the cutting spindle along the working surface,
the cutting spindle being rotatable about a further axis, parallel to the working surface, between a first position where the cutting disc is perpendicular to the working surface and a second position where the cutting disc is parallel to the working surface,
the cutting spindle being provided with a protection device which partially surrounds a periphery of the cutting disc, the protection device comprising:
a protection element forming an enclosure that partially surrounds the disc's periphery and,
sucker means positioned on an outer surface of the protection element, the protection element defining a fluid communication pathway between the sucker means and a vacuum circuit, the sucker means being closed off from an inner space of the enclosure wherein the cutting disc resides, the sucker means able to adhere and fix to the protection device materials processed on the working surface with the cutting disc when the cutting spindle is in the second position.

13. Machine according to claim 12, characterized in that said sucker means are extendable so as to project from said protection element.

14. Machine according to claim 12, characterized in that said protection element has a semi-circular peripheral edge with a circular half-rim on which the sucker means are arranged.

15. Machine according to claim 14, characterized in that said protection element is a first protection element and the protection device comprises a second protection element which is mounted on said first protection element so as to close the circular half-rim and which is removable so as to allow disassembly of the cutting disc.

16. Machine according to claim 15, characterized in that the second protection element is provided with its own sucker means.

17. Machine according to claim 12, further comprising two longitudinally arranged support structures on which respective travel rails are positioned, a spindle-carrying crossbeam extending transversely between said two support structures and slidably mounted on said travel rails so as to be moved in said longitudinal direction along the travel rails, a sleeve support carriage slidably mounted on said spindle-carrying crossbeam, a spindle carrying sleeve movable vertically relative to said sleeve support carriage, and the working surface for supporting the material to be processed is arranged between said two support structures, said cutting spindle provided with said protection device containing said sucker means being mounted on a bottom end of said spindle carrying sleeve so as to be able to pick up and move the material to be processed on the working surface.

18. Machine according to claim 12, characterized in that said working surface comprises a conveyor belt with a rubber-lined surface.

19. Machine according to claim 12, further comprising loading means for transferring articles to be machined onto said working surface and unloading means for removing machined articles from said working surface.

20. Machine according to claim 12, further comprising retaining means arranged coaxially with the cutting disc for supporting a further machining tool.

21. The machine of claim 12, wherein the sucker means are arranged in a plane which is traverse to said rotational axis, wherein action of the sucker means at the outer surface is in a direction that is substantially parallel to said rotational axis.

22. The machine of claim 12, wherein the sucker means are arranged on an outer surface of the protection element in a plane, the plane being substantially parallel to a planar surface of the cutting disc.

23. Protection device in combination with a cutting disc, the protection device comprising:
a protection element that partially overlays and shields the cutting disc; and
a plurality of suckers which are incorporated on an outer surface of the protection element, the plurality of suckers comprising openings in the outer surface so as to correspondingly move with movement of the protection element, each of the openings being oriented to face in a direction away from the cutting disc so as to adhere and fix materials that have been processed with the cutting disc to the outer surface of the protection element during a suction being provided to the plurality of suckers via the openings, and wherein the openings are closed off from an inner area of the protection element wherein the cutting disc resides.

24. The protection device of claim 23, wherein the cutting disc has a rotational axis, wherein action of the plurality of suckers at the distal surfaces is in a direction that is substantially parallel to the rotational axis.

* * * * *